A. B. HITCHCOCK.
Harvester Rake and Reel.
No. 94,887.
Patented Sept. 14, 1869.
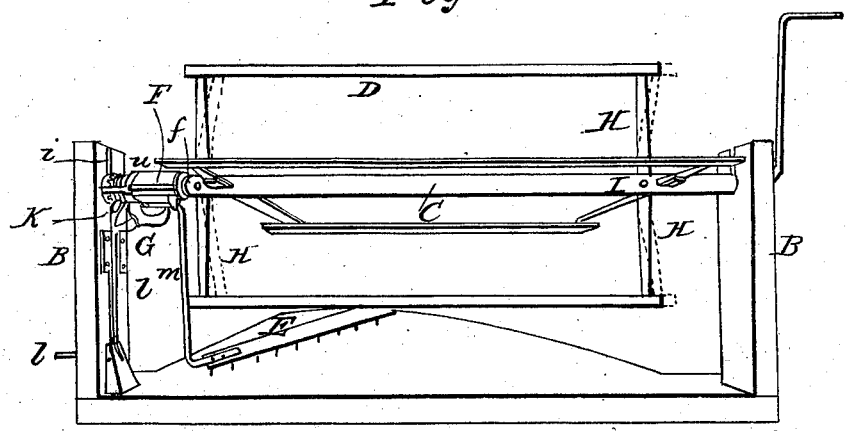

UNITED STATES PATENT OFFICE.

A. B. HITCHCOCK, OF JUNEAU, WISCONSIN.

COMBINED RAKE AND REEL FOR HARVESTERS.

Specification forming part of Letters Patent No. 94,887, dated September 14, 1869.

*To all whom it may concern:*

Be it known that I, A. B. HITCHCOCK, of Juneau, Dodge county, Wisconsin, have invented certain new and useful Improvements in Harvester Rakes and Reels; and I do hereby declare that the following is a full, clear, and exact description of the same, reference being had to the accompanying drawings, making part of this specification, in which—

Figure 1 is a front elevation; Fig. 2, a perspective view of the collar; Fig. 3, a perspective view of sliding cone; Fig. 4, a perspective view of the rake-cylinder; Fig. 5, an end view of same; Fig. 6, a side view of same; Fig. 7, a detached portion of the reel-shaft; Fig. 8, a perspective view of the cams, and Fig. 9 a top or plan view of the cams.

The nature and objects of my invention consist in attaching a rotary rake with side delivery to the reel of a harvesting-machine, and in the devices and parts for operating the same, as hereinafter set forth.

To enable others skilled in the art to make and use my improvements I will proceed to describe their construction and operation.

In the drawings, A represents a platform to receive the grain as it falls from the cutters, the cutter being located immediately in front, but not shown, as my invention can be used with all kinds of cutting apparatus. C D represent a reel, which is supported in suitable bearings B. The method of hanging or supporting this reel will depend upon the construction of the machine to which it is attached. The reel is operated by a pulley and belt or chain, or by any other suitable means. The arms H of the reel are made separate for each fan or bar D, and are tapered or not, as may be desired. These arms are made to pass each other at their sides in the same mortise of the shaft C, and are held in place by a single bolt or set-screw, I. By this arrangement the diameter of the reel can be increased or diminished at pleasure, and the position of the reel changed by crowding the bars to the right or left, as desired.

At the inner end of the shaft C I attach a rake, which revolves with the reel when in operation. This rake is attached by means of two cylinders or collars, F and *g*. The inner one, *g*, is fitted to the shaft C, and the outer one, F, fits over that, and is prevented from revolving upon it by the tongue *h*, which fits into the groove *r*. (See Figs. 3 and 5.) A collar, *f*, Fig. 7, is permanently attached to the shaft C, and its under surface or inner edge is provided with teeth or projections *e*, while its outer surface projects over them so as to present an end bearing or guide for the cylinder F, as shown. The teeth or projections *s* of the collar *g* engage the teeth *e* of the permanent collar *f*, when the rake is in operation. The collar *g* is longer than the cylinder F, and is enlarged in the projecting part. This part is provided with a groove, *i*, and a point or projection, *j*, which, when the collar *g* is slid upon the shaft, engages teeth *t* of a collar, *v*, which is permanently attached to the supporting-post by means of the arms *x x*. This collar *v* is provided with a curved projection, *u*, which presses against the end of the cylinder F, and not only keeps it in place when the machine is in operation, but prevents that cylinder from sliding with the sliding collar *g* when so moved as that the projection *j* engages the teeth *t*. The cylinder or hub F is made in sections, and bolted together by means of flanges, and is provided with an inclined surface, *q*, and an elevation and stop, *y*. The rake-arm *m* is attached to this cylinder or hub by means of a swivel-post, *n*, to which it is pivoted. The rake-arm is bent, as shown in Fig. 4, and is long enough to allow the rake-head E to pass around or over the fans or bars D. The outer end of the arm is again bent at *o*, as shown at Fig. 4, and is provided with an anti-friction wheel at the end, and it is provided with another, *p*, which operates upon the inclined surface *q*. This end *o* plays in the cam-box G, which box is attached to the supporting-post B just below the collar *v*, and semicircular or concave, as shown at Fig. 8, and is provided with a projection, *a*, which extends about two-thirds of the distance across the box. The side W is placed at an angle, so as to continue the side movement of the rake and place it in position to be returned. On the other side it is provided with a cam, *b*, and an extension, *c*. The cam *b* releases the catch-spring *d*, which is attached to the cylinder F, and holds the spring compressed until it passes the extension *c*, when it is released, and acts as a stop to prevent the rake from turning too far on the swivel-post *n*.

I also attach to the inner post B a lever, $l$, which is carried through the post, or so attached as to be accessible to the driver. This lever is provided with a fork, which passes into and connects with the sliding collar $g$ by means of the groove $i$. This lever is so attached that when it is at rest the teeth $s$ will engage the teeth $e$ of the permanent collar $f$, and the rake will then revolve with the reel; but, when depressed, these teeth will be disengaged, and the projection $j$ will then engage the teeth $t$ of the post-collar $v$, when the rake will remain stationary, while the reel will continue to revolve. In operation the rake strikes the platform A on a line with the cutter by the revolving of the reel. The bent end $o$ of the arm $m$ passes into the box G in a straight line until it strikes the cam $a$, when it turns at nearly a right angle and causes the rake to turn upon the post $n$ and throws it around so as to deliver the cut grain off from the side of the platform which is opposite to the standing grain. The bent end $o$ then strikes against the side $w$, which keeps the rake-head E at nearly a right angle with the shaft $c$, until it is elevated nearly to the top of the reel, when, being slightly inclined inward, it will of its own weight fall into line with the shaft or with the bars D. Just after it falls into place, the spring $d$ is released from under $c$, and a catch at the end of the spring $d$ receives it, and prevents it from falling too far, or in an opposite direction. The rake will then be held from turning in either direction by the spring $d$ and the stop $y$ until it descends to the platform, when the cam $b$ releases the spring-catch and the rake will turn as before, and while passing over or across the platform it will be held down to its work by the incline $q$ upon which the roller $p$ operates.

The reel is adjusted laterally so as to correspond with the cutter by loosening the screws I and moving the bars B, as indicated by the red lines in Fig. 1. When placed as desired, the screws are tightened so as to hold them.

I am aware that reels having separate arms for each bar, so that the diameter of the reel can be changed, have been used heretofore, and I do not claim that feature as my invention, but when so made there has been no provision for any lateral adjustment of the reel, as the arms passed each other in the shaft at their edges instead of at their sides, as in my reel, and were secured with keys, so that such adjustment was prevented, and is impossible in their construction.

Having thus fully described my improvements, what I claim as new, and desire to secure by Letters Patent, is—

1. The arm $m$ of the rake, when constructed as described, in combination with the cylinder F.

2. The collar $g$, in combination with the collars $v$ and $f$, when constructed and operating substantially as and for the purposes specified.

3. The lever $l$, in combination with the sliding collar $g$, and stationary collars $v$ and $f$, substantially as described.

4. The arm $o$, in combination with the cams $a$ and $w$, for operating and turning the rake substantially as specified.

5. The cam $b$, in combination with the spring $d$, for locking and unlocking the rake, substantially as described.

6. The post-collar $v$, when provided with teeth $t$ and projection $u$, substantially as and for the purposes specified.

7. Connecting the separate arms H of the reel-bars D to the shaft by mortise and set-screw or bolt I, so that the diameter of the reel can be regulated, and the reel laterally adjusted, substantially as specified.

A. B. HITCHCOCK.

Witnesses:
L. L. BOND,
E. A. WEST.